UNITED STATES PATENT OFFICE.

ANDERS THERKELSEN AND JULIUS GEORG ALFRED BRUUN, OF COPENHAGEN, DENMARK.

GOVERNOR.

SPECIFICATION forming part of Letters Patent No. 316,848, dated April 28, 1885.

Application filed January 27, 1885. (No model.)

*To all whom it may concern:*

Be it known that we, ANDERS THERKELSEN and JULIUS GEORG ALFRED BRUUN, subjects of the King of Denmark, residing at Copenhagen, in the Kingdom of Denmark, have invented certain new and useful Improvements in Governors; and we do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a side view of our improved speed-governor. Fig. 2 is a vertical section of the same.

Similar letters of reference indicate corresponding parts in both the figures.

Our invention has relation to speed-governors for motors; and it consists in the improved construction and combination of parts of a governor, which shall be very sensitive for changes in the motor, and at the same time not be affected by changes in the pressure of the power-creating medium, steam or whatever it may be, as will be more fully described and claimed.

In the accompanying drawings, the letter A indicates a bifurcated casting formed with a bearing, B, in its shank, in which the shaft C, upon which the drive-pulley D of the governor is secured, turns, and two vertical bearings, E E, in its ends, in which the vertical shafts and sleeves of the governor are journaled.

A vertical shaft, F, has two pairs of ears, G, at the upper end, between which ears the arms H, upon which the balls I are secured, are pivoted, and a pair of arms, J, are pivoted at their upper ends to the ball-bearing arms, and at their lower ends to the upper end of a sleeve, K, sliding upon the vertical shaft and having a laterally-projecting flange, L, at its lower end. The upper end of the sleeve K bears against the lower end of a spiral spring, M, wrapped around the vertical shaft, and the upper end of the spring bears against a nut, N, fitting upon a screw-threaded portion, O, of the vertical shaft, by means of which nut the tension of the spring may be adjusted, which will regulate the force required to raise the balls and sleeve.

An annular disk or flat ring, P, is secured above the flange L to the upper end of an upwardly-projecting arm, Q, secured to the upper vertical bearing E, and the flange L may bear against this ring when raised to its limit, and be stopped by the same sliding against it.

A flange, R, of the same diameter as flanges L and P, projects laterally from the upper end of a sleeve, S, which turns in the upper bearing, E, and turns upon the vertical shaft F, and the lower end of this sleeve has a beveled pinion, T, secured upon it. This pinion meshes with a bevel-pinion, U, secured upon the drive-shaft C, which thus keeps the sleeve S revolving at a speed corresponding to the speed of the engine, and the said sleeve will impart motion through its flange to the flange L and the vertical shaft F, causing the shaft and the balls to revolve.

It will be seen that if the shaft F and the balls revolve with a greater speed than is desired to keep up as a main speed the balls and their arms will raise the flange L up against the ring P, which by friction will stop the speed of the flange and shaft, and if the shaft and balls lose their desired speed the weight of the balls will force the flange L downward into contact with the revolving flange R, which again will start the flange and shaft, and the main speed may be determined by adjusting the weight of the balls and by adjusting the distance between the ring P and flange R, as well as by adjusting the nut upon the threaded portion of the vertical shaft, and adjusting the tension of the spring forcing the sleeve and disk down, all these adjustments determining the speed with which the vertical shaft and the balls will revolve when the flange L is free of both ring P and flange R.

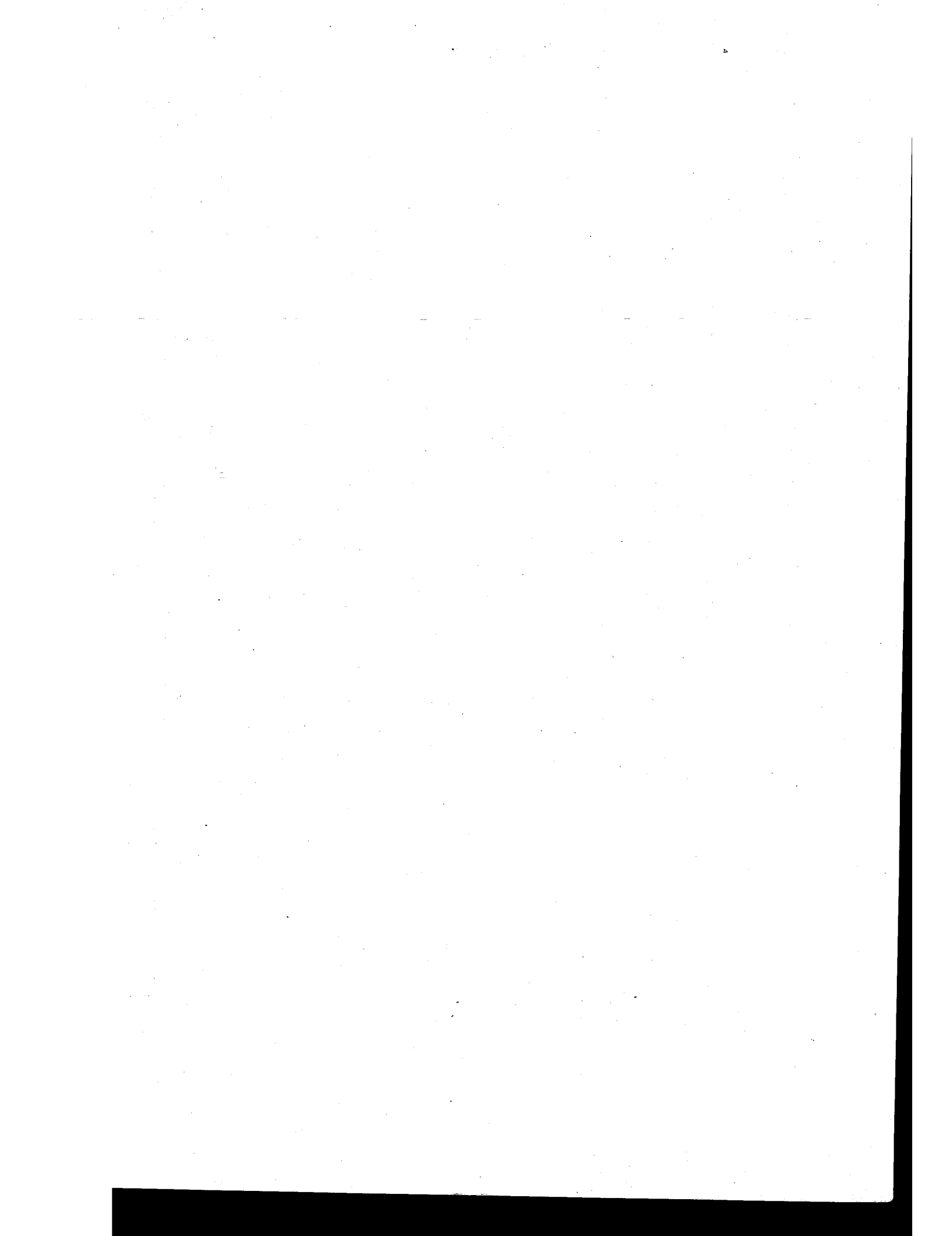

A bevel-pinion, V, is secured upon the vertical shaft F below the bevel-pinion T, and a bevel planet-pinion, W, is journaled upon a stud, X, formed upon a sleeve, Y, secured upon the upper end of a short vertical shaft, (No Model.)
A. THERKELSEN & J. G. A. BRUUN.
GOVERNOR.
No. 316,848. Patented Apr. 28, 1885.
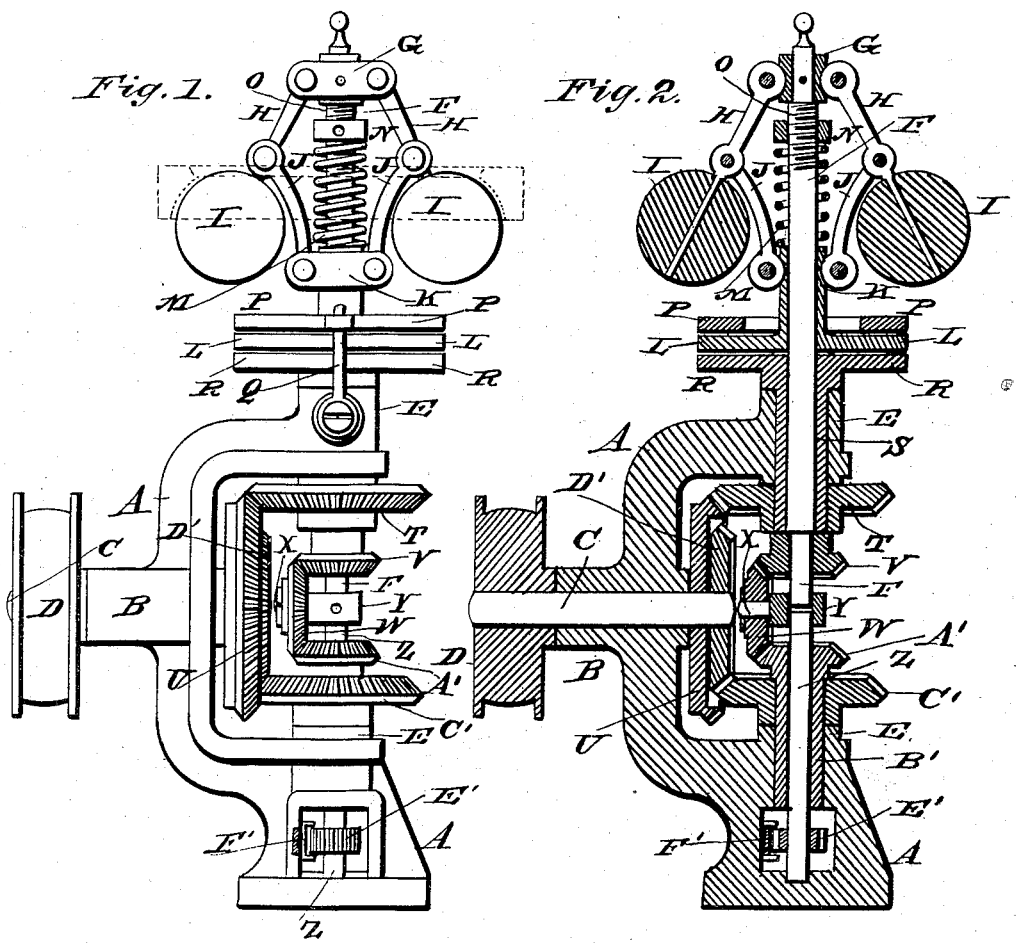
WITNESSES:
INVENTORS,
Anders Therkelsen
Julius G. A. Bruun
By Louis Bagger & Co.
ATTORNEYS.